(12) United States Patent
Cremers et al.

(10) Patent No.: US 6,985,836 B2
(45) Date of Patent: Jan. 10, 2006

(54) COMPUTER-AIDED ENGINEERING METHOD AND APPARATUS FOR PREDICTING A QUANTITATIVE VALUE OF A PHYSICAL PROPERTY AT A POINT FROM WAVES GENERATED BY OR SCATTERED FROM A BODY

(75) Inventors: Luc Cremers, München (DE); Pierre Guisset, Ottignies-Louvain-la-Neuve (BE); Luc Meulewaeter, Aalst (BE); Michel Tournour, Leuven (BE)

(73) Assignee: LMS International N.V., Leuven (BE)

( * ) Notice: Subject to any disclaimer, the term of this patent is extended or adjusted under 35 U.S.C. 154(b) by 543 days.

(21) Appl. No.: 09/898,957

(22) Filed: Jul. 3, 2001

(65) Prior Publication Data

US 2002/0035456 A1 Mar. 21, 2002

(30) Foreign Application Priority Data

Jul. 3, 2000 (GB) .............................................. 0016259

(51) Int. Cl.
*G06F 17/50* (2006.01)

(52) U.S. Cl. ................................ 703/2; 703/5; 324/309
(58) Field of Classification Search ..................... 703/2, 703/5; 324/307, 309, 314
See application file for complete search history.

(56) References Cited

U.S. PATENT DOCUMENTS 6,407,548 B1 * 6/2002 Dietz .......................... 324/307

* cited by examiner

*Primary Examiner*—Thai Phan
(74) *Attorney, Agent, or Firm*—Barnes & Thornburg LLP

(57) ABSTRACT

The invention relates to Computer-Aided Engineering (CAE) systems. It concerns a new methodology to predict (1) the acoustic radiation characteristics of a mechanical structure, under operational conditions, and (2) to identify the sources on a vibrating structure from measured sound pressure levels in the field. The methodology is based on a new approach to evaluate acoustic transfer vectors (ATV), based on the reciprocity principle and combined with interpolation techniques. The same methods are applicable to other vibrating energy forms which can be described by the wave equation such as electromagnetic waves.

19 Claims, 10 Drawing Sheets

Figure 6 : linear interpolation (B) of an Acoustic Transfer Vector (R).

Figure 7: Spline interpolation (B) of an Acoustic Transfer Vector (R).

COMPUTER-AIDED ENGINEERING METHOD AND APPARATUS FOR PREDICTING A QUANTITATIVE VALUE OF A PHYSICAL PROPERTY AT A POINT FROM WAVES GENERATED BY OR SCATTERED FROM A BODY

FIELD OF THE INVENTION

This invention relates to Computer-Aided Engineering (CAE) and in particular to a Computer-Aided Engineering (CAE) method and apparatus for predicting a quantitative value of a physical property at a point from waves generated by or scattered from a body. For example, the physical property can be an acoustic signature of a vibrating structure.

BACKGROUND OF THE INVENTION

The acoustic performance of manufactured products is becoming an extremely important aspect in the design and development process, not only to improve the comfort of the user of the product (e.g. passengers in a car, in an aircraft), but also to reduce the nuisance to the surroundings (e.g. habitations close to highways or to an airport). A typical problem may be described or represented for numerical analysis as a vibrating body surrounded by a fluid which may be assumed effectively infinite at least as an approximation.

The concept of Acoustic Transfer Vectors (ATV's) is known [Y. K. Zhang, M.-R. Lee, P. J. Stanecki, G. M. Brown, T. E. Allen, J. W. Forbes, Z. H. Jia, "Vehicle Noise and Weight Reduction Using Panel Acoustic Contribution Analysis", SAE95, Paper 95NV69].

ATV's are input-output relations between the normal structural velocity of the vibrating surface and the sound pressure level at a specific field point (see FIG. 3). ATV's can be interpreted as an ensemble of Acoustic Transfer Functions from the surface nodes to a single field point. As such ATV's can be measured and are a physical parameter of a system. Literature refers sometimes to this concept as Contribution Vectors or Acoustic Sensitivities.

ATV's only depend on the configuration of the acoustic domain, i.e. the shape of the vibrating body and the fluid properties controlling the sound propagation (speed of sound and density), the acoustic surface treatment, the frequency and the field point. They do not depend on the loading condition. The concept of ATV's, and their properties, is not new, and has already been published in several scientific papers.

There are two computer-aided engineering processes that are key for evaluating and optimising the acoustic performance of structures: the ability to predict the acoustic radiation pattern of a vibrating structure, either from computed or measured surface vibrations (acoustic radiation prediction), and the ability to recover surface vibrations onto a vibrating structure from measured field sound pressure level. The latter one is sometimes the only manner to perform source identification, when it is impossible to apply measurement devices onto the structure surface (e.g. rotating tire).

These engineering processes rely on numerical analysis methods, amongst which the most popular are currently the various forms of the boundary element method (the direct mono-domain, the direct multi-domain and the indirect approaches), and the finite element method, that can be extended to handle unbounded regions, e.g. using infinite elements. Numerical analysis is well known to the skilled person, e.g. "The finite element method", Zienkiewicz and Taylor, Butterworth-Heinemann, 2000; "Numerical Analysis", Burden and Faires, Brooks/Cole, 2001; H. A. Schenck, "Improved integral formulation for acoustics radiation problems", J. Acoust. Soc. Am., 44, 41–58 (1981); A. D. Pierce, "Variational formulations in acoustic radiation and scattering", Physical Acoustics, XXII, 1993.; J. P. Coyette, K. R. Fyfe, "Solutions of elasto-acoustic problems using a variational finite element/boundary element technique", Proc. of Winter Annual Meeting of ASME, San Francisco, 15–25 (1989).

U.S. Pat. Nos. 5,604,893 and 5,604,891 describe finite element methods for solving acoustic problems by using an oblate finite element. The oblate finite element is based on a multipole expansion that describes a scattered or radiated field exterior to an oblate spheroid.

The computational cost associated with numerical methods for acoustic performance prediction is usually very large, and is linearly proportional to:

- the number of operational conditions (may be about a 100 different cases);
- the number of frequency lines to be evaluated for obtaining a representative response function (will typically be about 100 to 200);
- the number of design variants to be studied.

SUMMARY OF THE INVENTION

It is an object of the present invention to provide a method and apparatus for analysing physical systems by wave theory which is more efficient.

It is also an object of the present invention to provide a method and apparatus for analysing physical systems by wave theory which is quicker to carry out.

It is also an object of the present invention to provide a method and apparatus for analysing a physical system by wave theory which allows rapid recalculation following design modifications to the system.

The present invention provides a method for computing a Wave Transfer Vector based on the reciprocity principle, comprising the steps of: simulating positioning of a monopole, omnidirectional wave energy source at a reference position remote from a body; computing a boundary oscillation amplitude of the wave generated by the source at a surface of the body; deriving from the boundary oscillation amplitude said Wave Transfer Vector. A wave transfer vector of a body or structure surrounded by a medium may be described by the following equation:

$$Prop = \{wtv\}^T \{Bc\}$$

where Prop is a physical property to be determined at a field point remote from a body or structure whereby the oscillatory surface boundary conditions of the body or structure are defined as Bc. The surface boundary conditions generate or scatter waves which propagate through the medium to the field point and determine the physical property there. The wave transfer vector may be described as an array of transfer functions between the surface boundary conditions of a body or structure and a physical property of the medium generated at a field point. The medium does not have to uniform, i.e. made of a uniform materials. The field point may be in an internal domain (within the structure) and/or in an external domain (outside the structure).

The method may be used to analyze a structure or body in a medium in which Helmholtz's equation applies to the propagation of waves in the medium. The oscillatory surface states of the structure or body form one set of boundary conditions for the solution of Helmholtz's equation, e.g. at a field point.

The computing step may be carried out by a numerical method, which may comprise one of: a finite element method; a combination of finite and infinite element methods; a direct boundary element method; a direct multi-domain boundary element method; and an indirect boundary element method. The numerical method may be carried out on a digital computing system. The wave source may comprise an acoustic source.

The invention also provides a method for computing an additional Wave Transfer Vector comprising the steps of:
  computing at least a first and a second wave transfer vector at a first and a second predetermined frequency, respectively,
  computing the additional Wave Transfer Vector at a frequency intermediate the first and second frequency by interpolation between the first and second Wave Transfer Vectors.

A Wave Transfer Vector may be calculated or measured. The interpolation technique may comprise, for example, a polynomial interpolation mechanism (e.g. linear) or a spline interpolation mechanism (e.g. cubic spline) or any other suitable interpolation technique.

The invention also provides a method to compute a Modal Acoustic Transfer Vector (MATV) from an acoustic transfer vector (ATV) for a alternative coordinate system defined by a set of deformed shapes of a body, comprising the steps of:
  projecting the ATV into the alternative co-ordinate system. The set of shapes may be defined by eigen-frequencies (natural frequencies or natural modes) of the body or by Ritz vectors (which may be described as operational modes of the system generated by applying a specific operational state), for example. The MATV may be used to predict a response of the body or the effect of such a response at a reference point remote from the body.

The present invention also includes methods and apparatus which combines two or more of ATV calculation using the reciprocity principle, generation of additional ATV's by interpolation, solution of Helmholtz's equation using MATV derived from ATV's by projecting ATV's into modal space and generation of additional MATV's by interpolating between ATV's.

One or more methods of the invention may support an acoustic radiation prediction engineering process, in particular but not limited to automotive engine and powertrain noise radiation application.

One or more methods of the invention may support a modal-based acoustic radiation prediction engineering process, in particular but not limited to automotive engine and powertrain noise radiation application.

One or more methods of the invention may support an inverse numerical acoustics engineering process, in particular but not limited to automotive engine and powertrain noise radiation application.

One or more methods of the invention may support a modal-based inverse numerical acoustics engineering process, in particular but not limited to automotive engine and powertrain noise radiation application.

Shapes combined to build a structural response during a method of the invention may comprise Ritz Vectors.

One or more methods of the invention may support a Ritz-vectors-based inverse numerical acoustics engineering process, in particular but not limited to automotive engine and powertrain noise radiation application.

One or more methods of the invention may support an evaluation of multiple design alternatives, with respect to the acoustic performance prediction of vibrating structures.

One or more methods of the invention may support an evaluation of multiple design alternatives, with respect to the modal-based acoustic performance prediction of vibrating structures.

One or more methods of the invention may support an automated structural-acoustic optimization process, with the objective function being the acoustic performance prediction of vibrating structures.

One or more methods of the invention may support an automated structural-acoustic optimization process, with the objective function being the modal-based acoustic performance prediction of vibrating structures.

The invention also provides a processing engine adapted to carry out any of the methods of the invention.

The invention also provides a computer program product for execution on a computer, the computer program product executing any of the method steps of the invention.

The invention also provides a method of inputting at a near terminal a representation of a body and coordinates of a reference point and transmitting these to a remote terminal running a program for executing any of the method steps of the invention, and receiving at a near location an output of any of the methods. The output may comprise one of: an ATV, an oscillation amplitude such as an acoustic pressure level, a surface vibration of the body, a revised design of at least a part of the body, an acoustic intensity at a field point, a radiated acoustic power, a radiation efficiency, for example. Generally, the output may be a physical value at a field point or an integral or differential thereof, e.g. of an electric or magnetic field.

The present invention also comprises a computer system having a memory for computing a Wave Transfer Vector based on the reciprocity principle, comprising: means for simulating positioning of a monopole, omnidirectional wave energy source at a reference position remote from a body; means for computing a boundary oscillation amplitude of the wave generated by the source at a surface of the body; and means for deriving from the boundary oscillation amplitude said Wave Transfer Vector. The Wave Transfer Vector may be an Acoustic Transfer Vector.

The invention consists in one aspect in a new methodology to dramatically speed up the evaluation of the Wave Transfer Vectors, especially Acoustic Transfer Vectors and their exploitation. In particular, the use of the reciprocity principle provides improved accuracy of the ATV's because they can be computed and stored on an element basis and provides a reduction in computational effort, since the solution needs to be performed for a number of excitation vectors equal to the number of field points of interest, instead of to the number of boundary nodes.

Further on, the use of efficient interpolation techniques is very appropriate for evaluating ATV's, due to their smooth frequency dependence, and allows the restriction of their evaluation to a restricted set of master frequency lines, which are then de-coupled from the excitation frequency contents. This results in significant gains in computing time and data storage space. The use of ATV's allows a practical design optimization scheme because the computer intensive task (calculation of the ATV's) is performed up front, outside of the optimization loop (FIGS. 9a and b).

The developed methodology results therefore in a reduction of the computational cost attached to acoustic performance prediction and wave theory problems in general, making it quasi insensitive to the number of operational conditions, to the number of frequency lines of interest, and to the number of design variants. As such, it allows the acoustic performance prediction tool to be driven by an automated design exploration and optimisation tool.

The present invention will now be described by way of example only and with reference to the accompanying drawings.

DEFINITIONS

Figure 1:
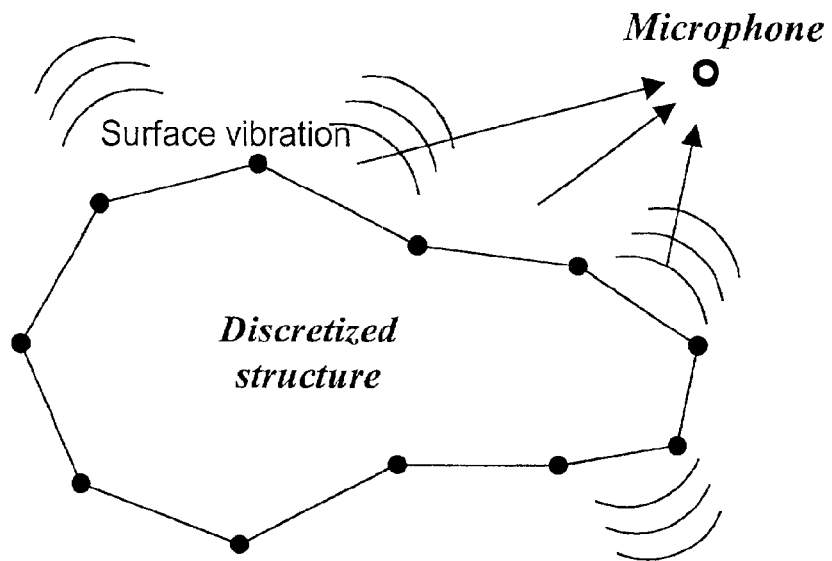
FIG. 1 is a schematic representation of Acoustic radiation Prediction.

Acoustic radiation prediction: is an engineering process that aims at predicting the sound pressure level in the surrounding field of a vibrating structure (see FIG. 1). Surface vibrations create acoustic pressure waves that propagate to the receiver.

Figure 2:
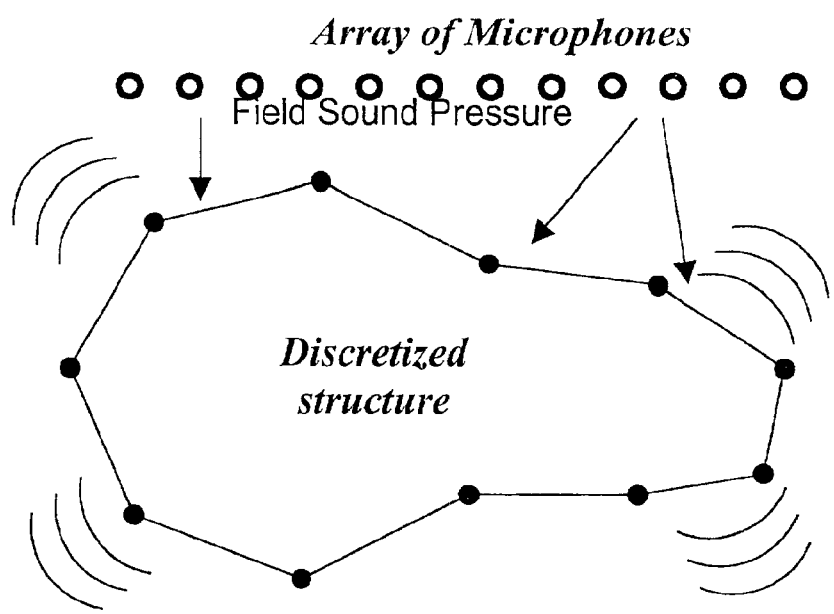
FIG. 2 is a schematic diagram of Inverse Numerical Acoustics.

Inverse numerical acoustics: is an engineering process that aims at deriving the surface vibration velocity from field sound pressure measurements (see FIG. 2). As such, it is the inverse problem to acoustic radiation prediction.

Discretization Methods: in order to solve acoustic radiation prediction problems and inverse numerical acoustics problems, computer models are built using numerical methods. The most frequently used numerical methods are the boundary element method (BEM) and the finite-infinite element method (FEM/IFEM). These methods rely upon a discretization of the geometrical domain (FEM/IFEM) or of its boundary (BEM) and solve, numerically, the wave equation in the frequency domain. There exists substantial published literature concerning both theoretical and practical aspects of these numerical methods, for some examples of which please see the bibliography included in this specification. The major computational effort involved within the application of many such numerical methods concerns the solution of a large system of linear equations.

DETAILED DESCRIPTION OF THE ILLUSTRATIVE EMBODIMENTS

The present invention will mainly be described with reference to acoustic waves but the invention is not limited thereto. The concepts underlying the present invention may be applied to any vibrating or oscillating energy wave which can be described by wave equations. For example, the present invention may be applied to electromagnetic waves. The present invention preferably relies on any suitable numerical methods for solving such equations and problems, such as the various forms of the boundary element method (the direct mono-domain, the direct multi-domain and the indirect approaches), and the finite element method, that can be extended to handle unbounded regions, e.g. using infinite elements.

Generally, the methods of the present invention may be applied to a body or structure surrounded by (external domain) or containing (internal domain) a medium in which waves, generated or scattered by surface states of the structure or body are propagated. The medium does not have to be uniform. One example of such a physical system is a vibrating structure surrounded by a medium such as air. Acoustic performance prediction is applied to many different kinds of products, in a process that is well standardised. As an example, let us consider an automotive powertrain structure, whose goal is to minimise the acoustic sound emission, and try to quantify the benefit due to the invention.

The following is a typical practical problem. A reasonable boundary element model will include about 7000 nodes/elements. It should be analysed under 50 different operating conditions, corresponding to different engine speed (RPM's). For building a full frequency response, about 200 frequency lines need to be computed. The performance at 10 microphone locations is of interest, for example to evaluate the radiated sound power (according to the ISO3744-1981 procedure).

Figure 3:
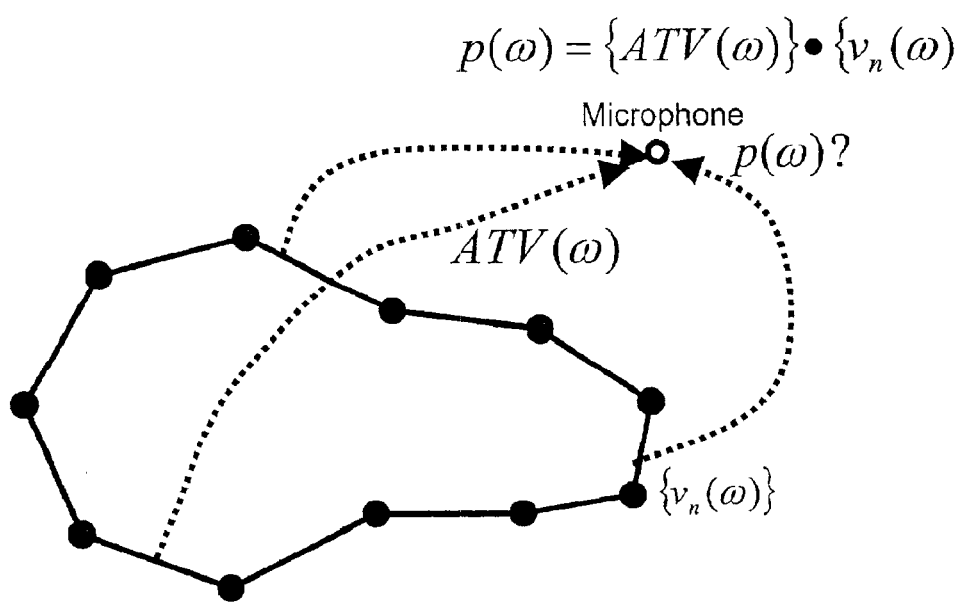
FIG. 3 is a schematic diagram of the concept of Acoustic Transfer Vectors.

The computational cost for processing such a model on an engineering workstation is based on following figures: the matrix assembly and factorisation process takes 5,400 seconds per frequency, and the back-substitution process (needed for each excitation case) takes 3 seconds per frequency. Assuming that about 20 different design alternatives need to be analysed in the design exploration process, the following estimations are obtained:

Using the traditional acoustic prediction technique (see FIG. 1) the total computational effort can be estimated to be the number of frequency lines (200) times the time for a single frequency analysis (5,400 sec+3 sec×50 load cases), times the number of design alternatives (20), i.e. 22.2 million seconds, corresponding to 257 computing days Using the Acoustic Transfer Vectors technique (FIGS. 3 and 4), computed in a direct way, the model has to be solved for a number of excitation cases equal to the number of nodes (7000), but since the exploitation time (scalar product) is neglectible, the total computational cost is independent of the number of design alternatives, and of operating conditions. Therefore, the total computational effort is estimated to be the number of frequency lines (200) times the time for a single frequency analysis (5,400 sec+3 sec×7000 right-hand-side vectors) i.e. 5.28 million seconds, corresponding to 61 computing days.

Using an embodiment of the present invention, i.e. an Acoustic Transfer Vectors technique computed in the reciprocal manner (FIG. 5 onwards) combined with an interpolation technique with 10 master frequencies, and neglecting the time for ATV interpolation and exploitation, the total computational effort can be estimated to be the number of master frequency lines (10) times the time for a single frequency analysis (5,400 sec+3 sec×10 load cases), i.e. 54,300 seconds, corresponding to 0.6 computing days.

This example shows that, given the above assumptions, the present invention leads to a reduction of the computational effort by a factor of 100 compared to the conventional ATV approach, and 400 compared to the traditional acoustic radiation prediction technique.

Theoretical background

Notations

| | |
|---|---|
| A, B, H, Q | Fluid domain matrix operators |
| ATV | Acoustic Transfer Vector |
| ATM | Acoustic Transfer Matrix |
| C | Sound velocity |
| C | Coupling matrix |
| G | Green's function |
| F | Frequency |
| K | Wave number |
| K, D, M | Fluid stiffness, damping and mass matrix operators |
| J | Imaginary number |
| N | Surface normal |
| P | Acoustic pressure |
| $p_b$ | Boundary acoustic pressure |
| S | Surface of the vibrating (emitting) structure |
| U, V | Complex matrices (SVD) |
| V | Acoustic particle velocity |
| $v_b$ | Boundary structural velocity |
| $v_s$ | Structural velocity |
| x | Observation point |
| y | Source point |
| β | acoustic admittance (complex) |
| ρ | mass density (complex) |
| σ | Single layer potential; singular values |
| μ | Double layer potential |
| ω | Circular frequency |
| i | Internal degrees of freedom (superscript) |
| j | Interface degrees of freedom (superscript) |

Governing Equation

Acoustic wave propagation in bounded or unbounded regions is governed by the wave equation. Assuming an harmonic behaviour, the time and space variables may be separated, leading to Helmholtz' equation:

$$\nabla^2 p + k^2 p = 0$$

where k is the wave number ω/c.

Four numerical formulations are typically available for solving Helmholtz equation over a region bounded by a surface S, with proper boundary conditions, and to build Acoustic Transfer Vectors in an improved way following the principles of the invention. Each of these methods may be implemented on a digital computing system by the appropriate software complied to execute on the computing system, especially by using numerixcal analysis.

1. The direct boundary element method (DBEM) formulation, using the acoustic pressure and velocity as boundary variables. This formulation can be used to model homogeneous interior or exterior domains.
2. The multi-domain direct boundary element method (MDDBEM) formulation, using the acoustic pressure and velocity as boundary variables. This formulation can be used to model a non-homogeneous domain by dividing it into a set of homogeneous sub-domains that are linked together by continuity conditions.
3. The indirect boundary element method (IBEM) formulation, using the single and double layer potentials (acoustic velocity jump and pressure jump respectively) as boundary variables. This formulation can be used to model a homogeneous domain, where both sides of the boundary radiate. In particular, it can be used to model an interior domain, an exterior domain or both simultaneously.
4. The acoustic finite/infinite element method (FEM) formulation, using the acoustic pressure as boundary variables. This formulation can be used to model a non-homogeneous interior domain, an exterior domain or both simultaneously.

Direct Boundary Element Method (DBEM) Formulation

Using the DBEM formulation, the acoustic pressure at any point of a homogeneous fluid domain containing no acoustic source can be expressed in terms of the acoustic pressure on the boundary domain and its normal derivative [see H. A. Schenk, "Improved integral formulation for acoustics radiation problems", J. Acoust. Soc. AM. 44, 41–58 (1981)]:

$$p(\vec{x}) = \int_S p(\vec{y}) \frac{\partial G(\vec{x}|\vec{y})}{\partial n_y} dS_y - \int_S \frac{\partial p(\vec{y})}{\partial n_y} G(\vec{x}|\vec{y}) dS_y \quad (1)$$

where $p(\vec{y})$ is the acoustic pressure on the boundary and $$\frac{\partial p(\vec{y})}{\partial n_y}$$

its normal derivative, $\vec{n}_y$ is the inward normal at point $\vec{y}$ on the boundary and $G(\vec{x}|\vec{y})$ is the Green's function. Making use of the Euler equation, equation (1) becomes:

$$p(\vec{x}) = \int_S p(\vec{y}) \frac{\partial G(\vec{x}|\vec{y})}{\partial n_y} dS_y + j\rho\omega \int_S v(\vec{y}) G(\vec{x}|\vec{y}) dS_y \quad (2)$$

where $v(\vec{y})$ is the normal acoustic velocity on the boundary, ρ is the fluid mass density and ω is the angular frequency. Note that the boundary acoustic velocity is related to the structural velocity through the following relationship:

$$v(\vec{y}) = v_s(\vec{y}) + \beta(\vec{y}) p(\vec{y}) \quad (3)$$

where $v_s(\vec{y})$ is the structural velocity and $\beta(\vec{y})$ the boundary admittance. Using equation (3), equation (2) becomes $$p(\vec{x}) = \int_S p(\vec{y}) \frac{\partial G(\vec{x}|\vec{y})}{\partial n_y} dS_y + \quad (4)$$

$$j\rho\omega \int_S \beta(\vec{y}) p(\vec{y}) G(\vec{x}|\vec{y}) dS_y + j\rho\omega \int_S v_s(\vec{y}) G(\vec{x}|\vec{y}) dS_y$$

This equation is true in the domain and on its boundary. Nevertheless, when evaluated on the boundary, the Green's function and its normal derivative become singular. Whereas the last two integrals of equation (4) are regular, the first one is singular and should be evaluated in the Cauchy's principal value sense:

$$c(\vec{x}) p(\vec{x}) = P.V. \int_S p(\vec{y}) \frac{\partial G(\vec{x}|\vec{y})}{\partial n_y} dS_y + \quad (5)$$

-continued $$j\rho\omega \int_S \beta(\vec{y})p(\vec{y})G(\vec{x}|\vec{y})dS_y + j\rho\omega \int_S v_s(\vec{y})G(\vec{x}|\vec{y})dS_y$$

where $$c(\vec{x}) = 1 + P.V. \int_S \frac{1}{4\pi|\vec{x}-\vec{y}|} \frac{\partial|\vec{x}-\vec{y}|}{\partial n_y} dS_y \quad (6)$$

in the three dimensional space. Note that $c(\vec{x}) = \frac{1}{2}$ for a smooth surface around $\vec{x}$.

Once discretized using boundary elements and evaluated at the mesh nodes, equation (5) leads to the following matrix system:

$$[A]\{p_b\} = [B]\{v_b\} \quad (7)$$

where the subscript b stands for boundary. Similarly, equation (4) gives:

$$p = \{d\}^T\{P_b\} + \{m\}^T\{v_b\} \quad (8)$$

Combining equations (7) and (8) leads to:

$$p = \{atv\}^T\{v_b\} \quad (9)$$

where $\{atv\}$ is the Acoustic Transfer Vector, given by:

$$\{atv\}^T = \{d\}^T[A]^{-1}[B] + \{m\}^T \quad (10)$$

The Acoustic Transfer Vector (ATV) is therefore an array of transfer functions between the surface normal velocity and the pressure at the field point. Finally, when the pressure is evaluated at several locations, equation (9) can be rewritten as:

$$\{p\} = [ATM]^T\{v_b\} \quad (11)$$

where the Acoustic Transfer Matrix [ATM] is formed by the different Acoustic Transfer Vectors.

More generally, a generalised wave transfer vector of a body or structure surrounded by a medium (external domain) or containing a medium (internal domain) may be described by the following equation:

$$Prop = \{wtv\}^T\{Bc\}$$

where Prop is a quantitative value of a physical property to be determined at a field point remote from a body or structure whereby the oscillatory surface boundary conditions of the body or structure are defined as Bc. The boundary conditions may be Dirichlet, Neumann or Robin boundary conditions. The surface boundary conditions generate or scatter waves which propagate through the medium to the field point and determine the physical property there. The wave transfer vector may be described as an array of transfer functions between the surface boundary conditions of a body or structure and a physical property of the medium generated at a field point. The waves may be any waves which can be described by Helmholtz's equation, e.g. acoustic waves or, for example, electromagnetic waves scattered from an object or generated by an antenna. The medium surrounding the body does not have to be uniform.

The principles of Wave Transfer Vectors and ATV's described above may be applied to any of the further embodiments described below.

Multi-Domain Direct Boundary Element Method (MDDBEM) Formulation

In case the acoustic region includes partitions characterised with different fluid material properties, the above formulation cannot be directly used since it is only valid for homogeneous domains. In such cases, a multi-domain integral formulation has to be used. The global acoustic region is then decomposed into sub-domains with the requirement that, within a sub-domain, the fluid properties need to be homogeneous. At the interface between the sub-domains, continuity conditions are enforced.

For sake of simplicity, let's consider here a two-domain model. Equation (7) for the first sub-domain can be written as:

$$\begin{bmatrix} A_1^{ii} & A_1^{ij} \\ A_1^{ji} & A_1^{jj} \end{bmatrix} \begin{Bmatrix} p_1^i \\ p_1^j \end{Bmatrix} = \begin{bmatrix} B_1^{ii} & B_1^{ij} \\ B_1^{ji} & B_1^{jj} \end{bmatrix} \begin{Bmatrix} v_1^i \\ v_1^j \end{Bmatrix} \quad (12)$$

where superscript i stands for internal degrees of freedom and superscript j stands for interface degrees of freedom. Similarly, equation (7) can be rewritten for the second sub-domain as:

$$\begin{bmatrix} A_2^{ii} & A_2^{ij} \\ A_2^{ji} & A_2^{jj} \end{bmatrix} \begin{Bmatrix} p_2^i \\ p_2^j \end{Bmatrix} = \begin{bmatrix} B_2^{ii} & B_2^{ij} \\ B_2^{ji} & B_2^{jj} \end{bmatrix} \begin{Bmatrix} v_2^i \\ v_2^j \end{Bmatrix} \quad (13)$$

The continuity of the normal velocity and acoustic pressure has to be satisfied at the interface between of the two sub-domains:

$$\begin{cases} v_1^j = -v_2^j = v^j \\ p_1^j = p_2^j = p^j \end{cases} \quad (14)$$

Combining equations (12), (13) and (14) leads to the global system of equations:

$$\begin{bmatrix} A_1^{ii} & A_1^{ij} & -B_1^{ij} & 0 \\ A_1^{ji} & A_1^{jj} & -B_1^{jj} & 0 \\ 0 & A_2^{ij} & B_2^{ij} & A_2^{ii} \\ 0 & A_2^{jj} & B_2^{jj} & A_2^{ji} \end{bmatrix} \begin{Bmatrix} p_1^i \\ p^j \\ v^j \\ p_2^i \end{Bmatrix} = \begin{bmatrix} B_1^{ii} & 0 \\ B_1^{ji} & 0 \\ 0 & B_2^{ii} \\ 0 & B_2^{ji} \end{bmatrix} \begin{Bmatrix} v_1^i \\ v_2^i \end{Bmatrix} \quad (15)$$

Using equation (15), one can define the Acoustic Transfer Vectors for the global system:

$$p = \{atv\}^T \begin{Bmatrix} v_1^i \\ v_2^i \end{Bmatrix} \quad (16)$$

and similarly derive the Acoustic Transfer Matrix [ATM] when the acoustic pressure has to be evaluated at different locations.

Indirect Boundary Element Method (IBEM) Formulation

Using an indirect formulation, the acoustic pressure at any point of the domain can be expressed in terms of single and double layer potentials [see A. D. Pierce, "Variational formulations in acoustic radiation and scattering", Physical Acoustics XXII, 1993]:

$$p(\vec{x}) = \int_S \mu(\vec{y}) \frac{\partial G(\vec{x}|\vec{y})}{\partial n_y} dS_y - \int_S \sigma(\vec{y}) G(\vec{x}|\vec{y}) dS_y \quad (17)$$

where $\sigma(\vec{y})$ and $\mu(\vec{y})$ are the single and double layer potentials, respectively.

For the Neuman problem (i.e. structural velocity boundary condition) and when both sides of the boundary have the same velocity (i.e. thin shell), this equation can be expressed only in terms of double layer potentials:

$$p(\vec{x}) = \int_S \mu(\vec{y}) \frac{\partial G(\vec{x}|\vec{y})}{\partial n_y} dS_y \tag{18}$$

Equation (18) can be evaluated on an arbitrary surface S'. It can be derived with respect to the normal at $x \in S'$, pre-multiplied by an admissible test function $\delta\mu(x)$ and integrated over the surface S':

$$\int_{S'} \frac{\partial p(\vec{x})}{\partial n_x} \delta\mu(\vec{x}) dS' = \int_{S'} \int_S \mu(\vec{y}) \frac{\partial^2 G(\vec{x}|\vec{y})}{\partial n_x \partial n_y} \delta\mu(\vec{x}) dS_y dS'_x \tag{19}$$

Now, let the surface S' tend to S and make use of the Euler equation:

$$-\int_S j\omega\rho v(\vec{x}) \delta\mu(\vec{x}) dS = \int_S \int_S \mu(\vec{y}) \frac{\partial^2 G(\vec{x}|\vec{y})}{\partial n_x \partial n_y} \delta\mu(\vec{x}) dS_y dS_x \tag{20}$$

After discretization using boundary elements, equation (18) becomes:

$$p = \{d\}^T \{\mu\} \tag{21}$$

Similarly, equation (20) becomes:

$$[Q]\{\mu\} = [H]\{v_b\} \tag{22}$$

Combining equations (21) and (22):

$$p = \{atv\}^T \{v_b\} \tag{23}$$

where {atv} is the Acoustic Transfer Vector, given by:

$$\{atv\}^T = \{d\}^T [Q]^{-1} [H] \tag{24}$$

When the acoustic pressure is evaluated at several locations, equation (23) can be rewritten as:

$$\{p\} = [ATM]^T \{v_b\} \tag{25}$$

where the Acoustic Transfer Matrix [ATM] is formed by the different Acoustic Transfer Vectors.

Finite/infinite Element Method (FEM/IFEM) Formulation

The solution of the Helmholtz equation based on a finite/infinite element approach leads to a system of linear equations:

$$([K] + j\rho\omega[D] - \omega^2[M])\{p\} = -j\rho\omega\{F\} \tag{26}$$

where K is the fluid stiffness matrix, D is the fluid damping matrix, M is the fluid mass matrix and F is the forcing vector, defined by:

$$\{F\} = [C]\{v_b\} \tag{27}$$

where C is a coupling matrix.

Combining equations (26) and (27),):

$$\{p\} = [ATM]^T \{v_b\} \tag{28}$$

where the Acoustic Transfer Matrix [ATM] is given by:

$$[ATM]^T = \frac{-j\rho\omega[C]}{([K] + j\rho\omega[D] - \omega^2[M])} \tag{29}$$

Finally, for each finite element grid point, the acoustic pressure can be written as:

$$p = \{atv\}^T \{v_b\} \tag{30}$$

where {atv} is the Acoustic Transfer Vector, given by the corresponding row of the $[ATM]^T$ matrix.

Use of the Reciprocity Principle

See F. Fahy, "The Reciprocity Principle and Applications in Vibro-Acoustics", Second International Congress on Recent Developments in air- and Structure Borne Sound and Vibration, 4–6 Mar. 1992, 591–598 and/or K. R. Fyfe, L. Cremers, P. Sas, G. Creemers, "The use of acoustic streamlines and reciprocity methods in Automotive design sensitivity studies", Mechanical Systems and Signal Processing (1991) 5 (5), 431–441.

An aspect of the present invention is the use of the reciprocity principle for efficiently computing the Acoustic Transfer Vectors. As shown in equations (10), (15), (24) and (29), the evaluation of any field point related ATV requires the inversion of a matrix, whose order is approximately equal to the number of nodes of the discretized geometry (mesh).

The numerical evaluation of the inverse of an order n matrix is performed by solving a system of linear equations, whose right-hand-side is built from the unity matrix, leading typically to one matrix factorisation, and n back-substitution steps.

$$[A][X] = [I] \tag{31}$$

For large matrix orders, the computational effort and time required for performing the n back-substitution steps is very significantly larger than the factorisation time.

Looking to equation (10), it can be deduced that an ATV is a vector for which each coordinate corresponds to the pressure at the corresponding field point due to a unit excitation (vibrating velocity) at one point/element on the surface, and no excitation elsewhere.

$$atv_i = \{atv\} \begin{Bmatrix} 0 \\ \vdots \\ 1 \\ \vdots \\ 0 \end{Bmatrix} \tag{32}$$

Figure 4:
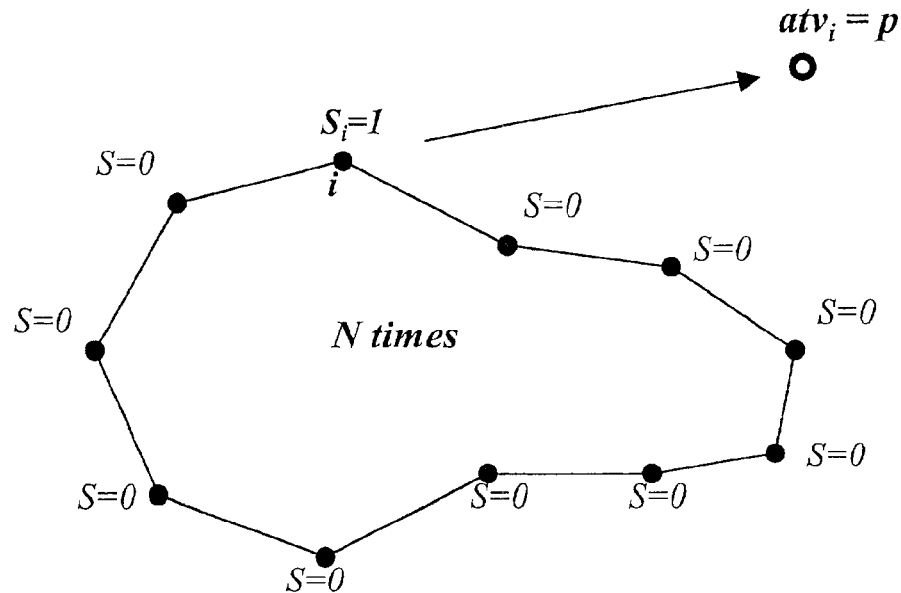
FIG. 4 is a schematic diagram of a direct method for evaluating Acoustic Transfer Vectors. This has to be repeated n times.

This is represented graphically in FIG. 4.

According to the reciprocity principle, the pressure response at a first location due to an excitation at a second location is strictly equal to the pressure response at the second location due to the same excitation at the first location. Therefore, if a source of strength $Q_1$ at position 1 causes a pressure $p_2$ at position 2, and if a source of strength $Q_2$ at position 2 causes a pressure $p_1$ at position 1, resulting in the following relationship:

$$p_1 Q_1 = p_2 Q_2 \text{ or } \frac{p_1}{Q_2} = \frac{p_2}{Q_1} \tag{33}$$

Figure 5:
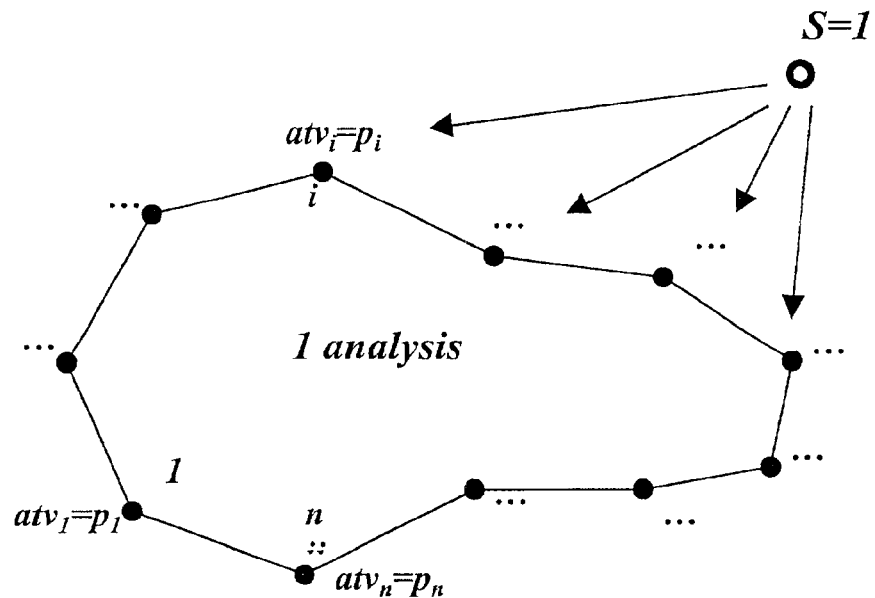
FIG. 5 is a schematic diagram of a reciprocal method for evaluating Acoustic Transfer Vectors in accordance with an embodiment of the present invention.

Using the reciprocity principle to evaluate the ATV related to a specific field point means that a monopole source (point source) of strength $Q_1$ should be positioned at the field point location 1, and the pressure is calculated on the boundary $p_2$. This is represented in FIG. 5.

Equation 11 shows how the ATV will be exploited to convert the boundary surface velocity (representing vibrations) into the field point acoustic pressure. Since a structure may be complex, containing T-junctions and other discontinuities, surface vibrations are better defined on surfaces, i.e. on finite elements, rather than at grid points (where the normal directly is not always uniquely defined). Therefore, it is required to define element-based acoustic transfer vectors.

In the case where the source placed on the boundary (in 2) is distributed over a small surface, equation (33) may be rewritten as:

$$p_1 Q_1 = \int_S p_2 v_2 dS \qquad (34)$$

where $v_2$ is the source velocity. In the particular case where the source is distributed over a single element, the pressure at any point on the surface can be approximated as:

$$p_2 = \langle p_2 \rangle \{N\} \qquad (35)$$

where $\{N\}$ is the interpolation function and $\langle p_2 \rangle$ is the pressure evaluated at the element nodes. Similarly the source velocity can be approximated as:

$$v_2 = \langle N \rangle \{v_2\} \qquad (36)$$

where $\{v_2\}$ is the source velocity at the element nodes. Equations (34) to (36) lead to the following relation:

$$p_1 Q_1 = \langle p_2 \rangle [C_e] \{v_2\} \qquad (37)$$

where $[C_e]$ is the element coupling matrix defined as:

$$[C_e] = \int_{S_e} \{N\}\langle N \rangle dS \qquad (38)$$

For a monopole source, the source strength is given by:

$$Q_1 = \frac{4\pi}{j\rho\omega} A \qquad (39)$$

where A is the monopole source amplitude. Combining (37) and (39):

$$p_1 = \frac{j\rho\omega}{4\pi A} \langle p_2 \rangle [C_e] \{v_2\} \qquad (40)$$

which can be rewritten as:

$$p_1 = [ATV_e] \{v_2\} \qquad (41)$$

where $[ATV_e]$ is the element-based acoustic transfer vector, computed by:

$$[ATV_e] = \frac{j\rho\omega}{4\pi A} \langle p_2 \rangle [C_e] \qquad (42)$$

Applying at the field point a monopole source with a unit amplitude (A=1 and $\omega=2\pi f$, we finally obtain the following expression for evaluating the element-based acoustic transfer vector:

$$[ATV_e] = \frac{j\rho f}{2} \langle p_2 \rangle [C_e] \qquad (43)$$

showing that the ATV related to a given field point can then be computed from the boundary sound pressure values, correctly scaled.

The use of the reciprocity principle for evaluating the ATV's leads to two fundamental advantages:
1. The ATV's can be directly computed on an element basis, removing the ambiguity inherent to nodal values, in case of sharp edges and T-junctions, where the normal vector is not uniquely defined.
2. The ATV related to a given field point can then be computed with a single excitation vector, representing the monopole source excitation at the field point. This leads to a single back substitution step. Since the number of field points (microphone locations) is usually several orders of magnitude lower than the number of boundary nodes, this results in tremendous gains in computational effort.

Interpolation Technique

In the case of sound wave propagation in an open space, the fluid domain does not exhibit any resonant behaviour. The sound field is fully determined by various wave mechanisms, such as reflection by solid objects, absorption on damping surfaces, diffraction around edge and wave interference. Therefore, for non-resonant media, Acoustic Transfer Vectors are rather smooth functions of the frequency, and ATV coefficients can be accurately evaluated at any intermediate frequency, called a slave frequency, using a mathematical interpolation scheme, based on a discrete number of frequencies, called master frequencies. It is important to note that the structural vibrations cannot be similarly interpolated, since these are directly dependent on the highly resonant dynamic behaviour of any structure (vibration mode shapes).

Figure 6:
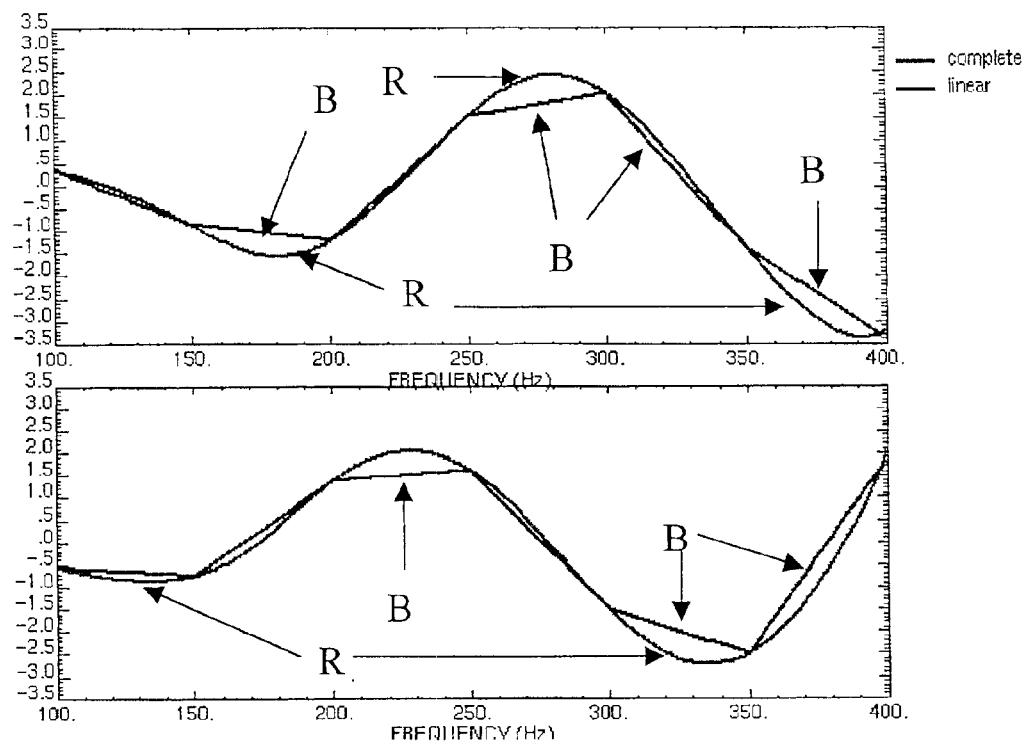
FIG. 6 is representation of a linear interpolation of an Acoustic Transfer Vector in accordance with an embodiment of the present invention. The interpolation curve (B) is superimposed on the ATV curve (R)
Figure 7:
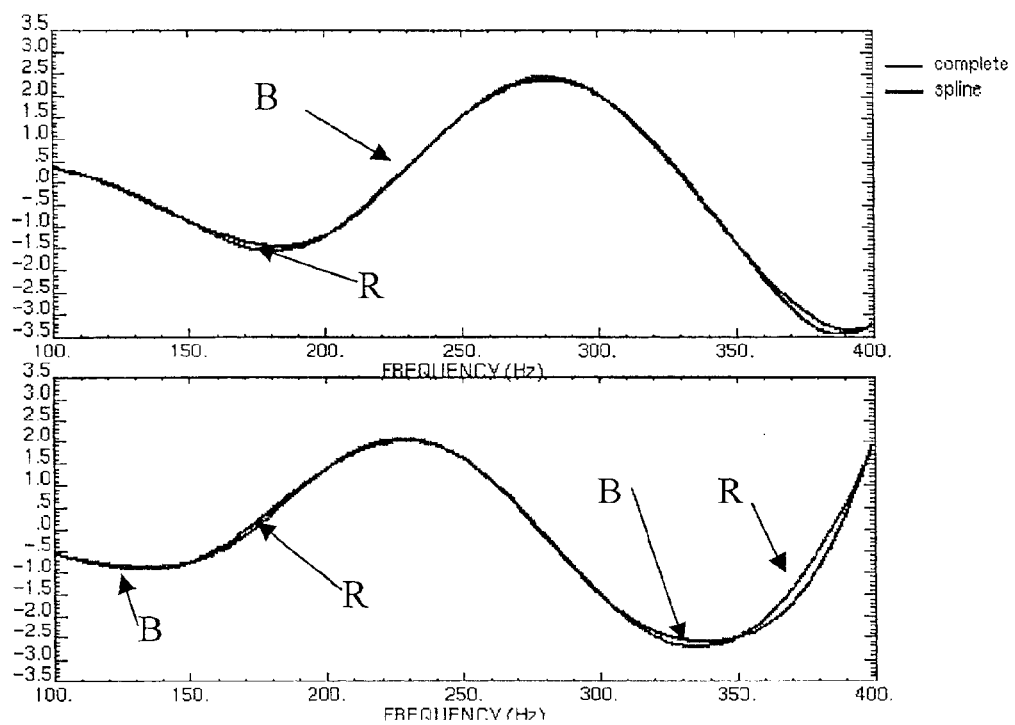
FIG. 7 shows a spline interpolation of an Acoustic Transfer Vector in accordance with an embodiment of the present invention. The interpolation curve (B) is superimposed on the ATV curve (R)

At least two interpolation mechanisms can be used:
1. A polynomial interpolation scheme such as a linear interpolation scheme (see FIG. 6);
2. A spline interpolation scheme such as a cubic spline scheme (see FIG. 7), which is particularly well suited for approximating ATV's (De Boor, C. A Practical Guide to Splines, Springer-Verlag, N.Y., 1978).

Other interpolation schemes can be used, e.g. stochastic interpolation (Kriging interpolation).

The use of an interpolation scheme for evaluating the ATV's leads to the following fundamental advantages:
1. It allows to build a complete frequency dependant ATV, with a very limited number of frequency lines to be computed. In order to build a complete frequency response with a traditional approach, the number of frequency lines to be computed is usually over a hundred. Using an interpolation mechanism, only a few master frequency lines needs to be explicitly computed, any other frequency being interpolated. The gain in computing time is usually over an order of magnitude.
2. Similarly, the ATV's have to be stored in a file database in order to be further exploited. For instance they may be stored in non-volatile memory of a computer system such as a disk or in mass storage or for example on a CD-ROM. The interpolation mechanism allows storage of only the master frequency ATV's in the database. The corresponding vector at any intermediate frequency may then be directly evaluated at a neglectible processing cost, and therefore does not need to be stored in the database. The gain in disk space is usually over an order of magnitude.

3. For some specific applications, such as automotive powertrains, the acoustic performance has to be evaluated for many different operational conditions (e.g. different rpm's), each of these having a different frequency contents. Using the ATV interpolation mechanism, the same set of master frequencies can be used to build a unique basis of ATV's, which are then interpolated and combined with the structural response corresponding to any load case, at any intermediate frequency needed for the specific operational condition.

Inverse Numerical Acoustics

Equations (11) and (25) are the basic relations for the inverse numerical acoustics theory. The sound pressure is measured at a large number of microphone (field points) and the boundary velocity can be obtained using the relationship:

$$\{v_b\}=[ATM]^{-1}\{p\} \quad (44)$$

However, the inversion of the acoustic transfer matrix is not obvious, because the matrix is generally not square but rectangular and because it involves a Fredholm equation (of the first kind for the indirect approach and of the second kind for the direct approach) and is ill conditioned. Therefore the matrix inversion is preferably performed using the singular value decomposition (SVD) technique, which allows the solution of singular or close to singular systems. It is based on the fact that any n×m complex matrix can be written as:

$$[ATM]=[V][\sigma][U]^H \quad (45)$$

where the superscript H stands for 'transpose complex conjugate', $[\sigma]$ is a diagonal min(n,m)×min(n,m) real matrix, $[U]$ is a m×min(n,m) complex matrix and $[V]$ is a n×min(n, m) complex matrix. The coefficients of $[\sigma]$, called singular values, are stored in an decreasing order and matrices $[U]$ and $[V]$ are such that:

$$[V]^H[V]=[U]^H[U]=[I] \quad (46)$$

From equations (45) and (46) it follows:

$$[ATM]^{-1}=[U][\sigma]^{-1}[V]^H \quad (47)$$

Nevertheless, singular or ill-conditioned matrices contain null or small singular values. This results in infinite or very large values in $[\sigma]^{-1}$. Whereas the infinite terms clearly lead to an infinite solution, the very large values lead to a solution of equation (44) that will be very sensitive to the right hand side variations. Therefore, small errors on the RHS will result in very large errors in the solution. To avoid this problem, the small or null terms of $[\sigma]$ are set to zero in $[\sigma]^{-1}$. This process is called truncated singular value decomposition. The singular values are set to zero as soon as $\sigma_i < \alpha \sigma_l$ where $\alpha$ is a tolerance parameter.

Panel Contribution Analysis

Figure 8:
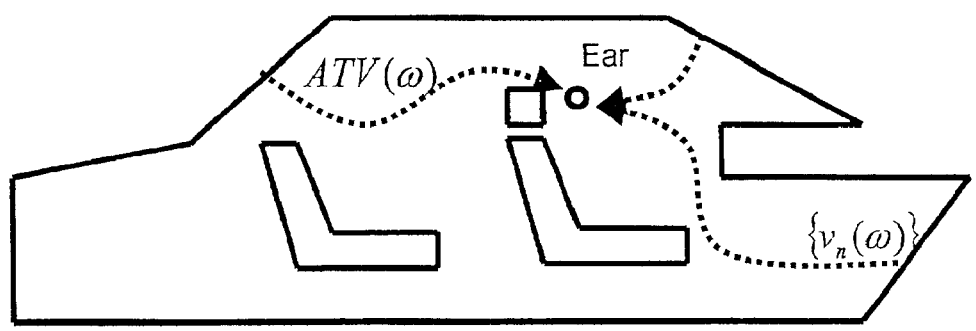
FIG. 8 shows an example of panel acoustic contribution analysis.

Panel Contribution Analysis is a fundamental engineering tool to guide the product refinement in the development process. It is shown schematically in FIG. 8 in which contributions reaching the ear of person in a vehicle come from different parts or panels of the vehicle. Equations (9), (16), (23) or (30) can be rewritten as:

$$p = \sum_{e=1}^{ne} p_e = \sum_{e=1}^{ne} [ATV_e]^T \{v_e\} \quad (48)$$

where ne is the total number of elements. Subsequently, the contribution of a panel is given by the summation of element contributions over the panel elements:

$$p_c = \sum_{pe} p_e = \sum_{pe} [ATV_e]^T \{v_e\} \quad (49)$$

where pe stands for panel elements.

Modal ATV

The engineering process to compute the structural velocity $\{V_b\}$ on a vibrating surface relies usually on the structural finite element method, and often on a modal superposition approach, where the structural response is expressed as a linear combination of the mode shapes of the body:

$$\{v_b\}=[\Phi_n]\{mpf\} \quad (50)$$

Where $[\Phi_n]$ is the matrix composed of the modal vectors, projected on the normal direction to the boundary surface, and $\{mpf\}$ are the modal participation factors, also called the modal response of the structural model, at a given excitation frequency. The term "mode" relates not only to natural or "eigen-" frequencies but also to operational frequencies such as defined by Ritz vectors.

Combining (50) with Equations (9), (16), (23) or (30) leads to:

$$p=\{atv\}^T[\Phi_n]\{mpf\} \quad (51)$$

where $$\{atv\}^T[\Phi_n]=\{matv\}^T \quad (52)$$

is called the Modal Acoustic Transfer Vector, which can be directly combined with the modal response to give the sound pressure at a field point:

$$p=\{matv\}^T\{mpf\} \quad (53)$$

The concept of Modal Acoustic Transfer Vectors can be extended to any possible deformation shapes of the body, so-called Ritz vectors. This is especially interesting in the case of inverse numerical acoustics, where the unknown becomes then the modal participation factors.

Optimisation Strategy

An embodiment of the present invention includes a method that allows the numerical acoustic radiation prediction calculation to be extremely fast, the main computational intensive task (calculation of the ATV's) being done as a pre-processing step. Therefore, it is directly possible and practical to integrate the acoustic radiation prediction within an optimisation loop, where the objective function is the acoustic performance (sound pressure levels, or radiated power according to the ISO3744-1981 procedure), and where the design variables are either structural or acoustic design variables.

Figure 9A:
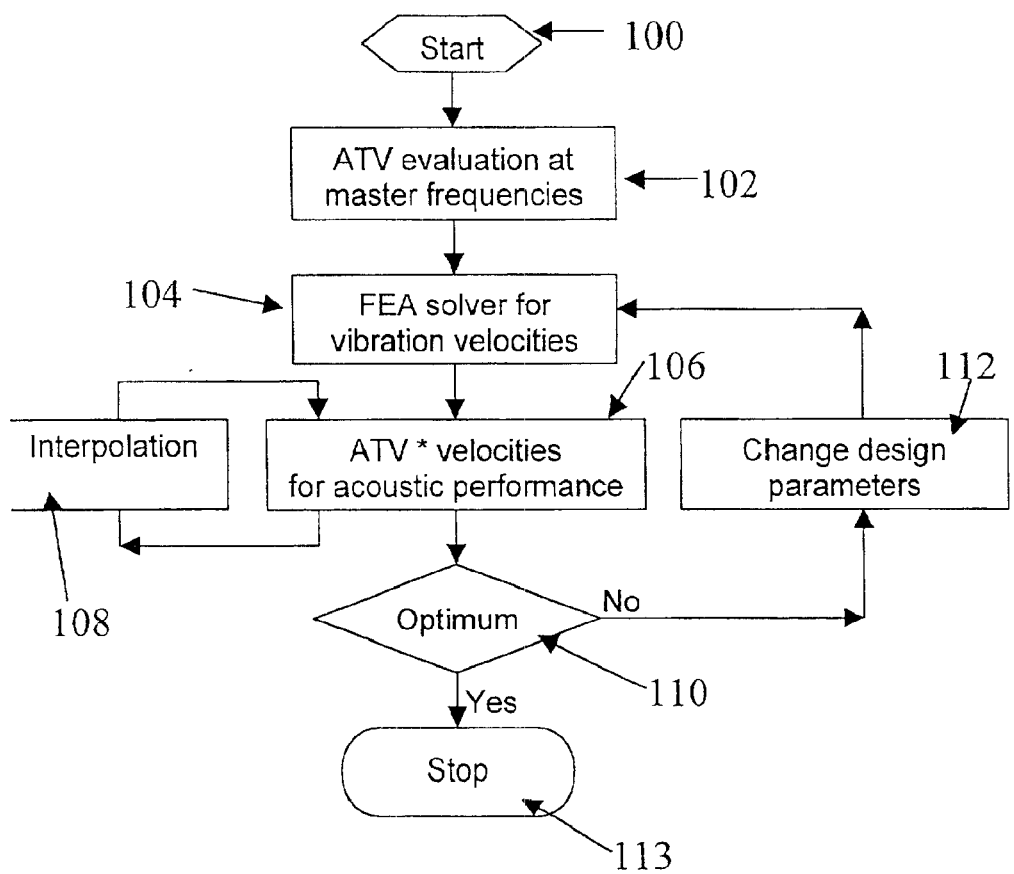
FIGS. 9A and B show flow charts of an optimization process based on ATV's and MATV's respectively, in accordance with embodiments of the present invention.

An optimisation process in accordance with an embodiment of the present invention is shown at FIG. 9a. The optimisation process will normally be carried out on a digital computing system. It will typically combine a structural dynamic finite element solver (step 104) together with an ATV-based acoustic prediction tool (step 106). In step 102 a set of ATV's is evaluated for the structure to be analysed using, for example, the reciprocity principle as described above. In step 104 a solver is used to determine the surface vibration velocities of the structure. Commercially available solvers are, for example, MSC.Nastran from MSC Software, USA, ANSYS from Ansys Inc. USA, ABAQUS from HKS Inc. In step 106 the ATV's are combined with the surface velocities to determine an acoustic signature at one or more field points. As part of this process an ATV interpolation step (108) may optionally be used to increase the number of available ATV's.

The achieved performance is compared in step 110 with a desired performance or with a previously calculated performance to determine if a desired or optimum performance is achieved. If not, a design change can be made in step 112, e.g. add or remove stiffening elements to the structure, change a dimension of the structure or a material (e.g. to provide more or less damping). Provided these changes are relatively minor there will be no appreciable change in the ATV's and therefore step 102 does not need to be repeated. Instead the vibration response is recalculated in step 104 and a new performance analysis carried out. Avoiding the re-calculation of the ATV's is a significant advantage of this embodiment.

Figure 9B:
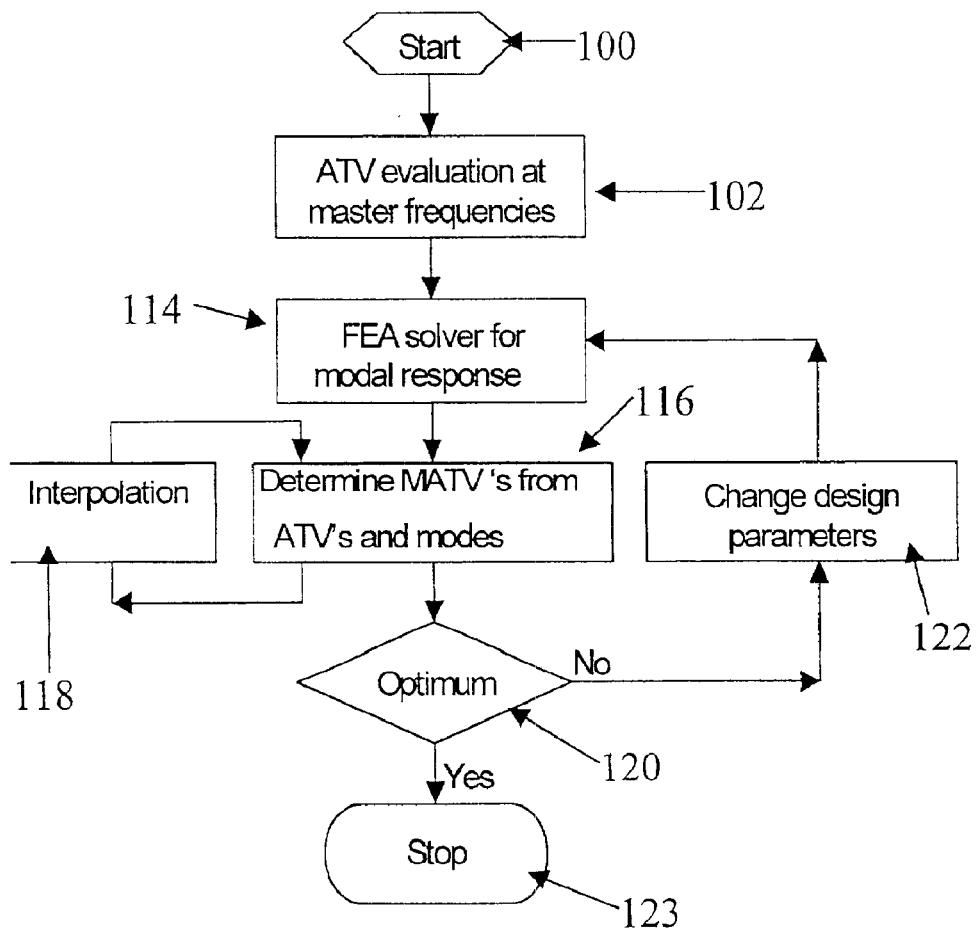

A similar methodology is shown in FIG. 9b using MATV's. In this case step 106 is replaced with a step 116 of obtaining the MATV by projecting the ATV's determined in step 102 into a co-ordinate system defined by the vibrational modes determined in step 114. The modes used may be natural modes, e.g. the shapes of the structure determined by the natural or eigen-frequencies of the structure, or the modes may be operational modes, e.g. those determined by Ritz vectors. An optional interpolation step 118 may be used to generate MATV's at intermediate frequencies. The response at one or more field points is calculated from the MATV's in step 120 in which the results are compared with a previously calculated result or with a desired result. If unsatisfactory a design change may be made in step 122 and re-evaluated in steps 114–120.

Implementation

The methods of the present invention may be implemented on a processing engine such as a workstation or a personal computer. The processing engine may be a server accessible via a telecommunications network such as a LAN, a WAN, the Internet, an Intranet. The server may be adapted to carry out any of the methods of the present invention, for example a descriptor file of a body may be entered at a near terminal and transmitted to the server via the Internet. The server then carries out one of the methods of the present invention and returns to a near location e.g. an e-mail box, any response of any of the methods in accordance with the present invention. Such a response may be, for instance, an ATV, a vibrational amplitude such as an acoustic pressure level, a surface vibration of the body, a revised design of at least a part of the body.

Figure 10:
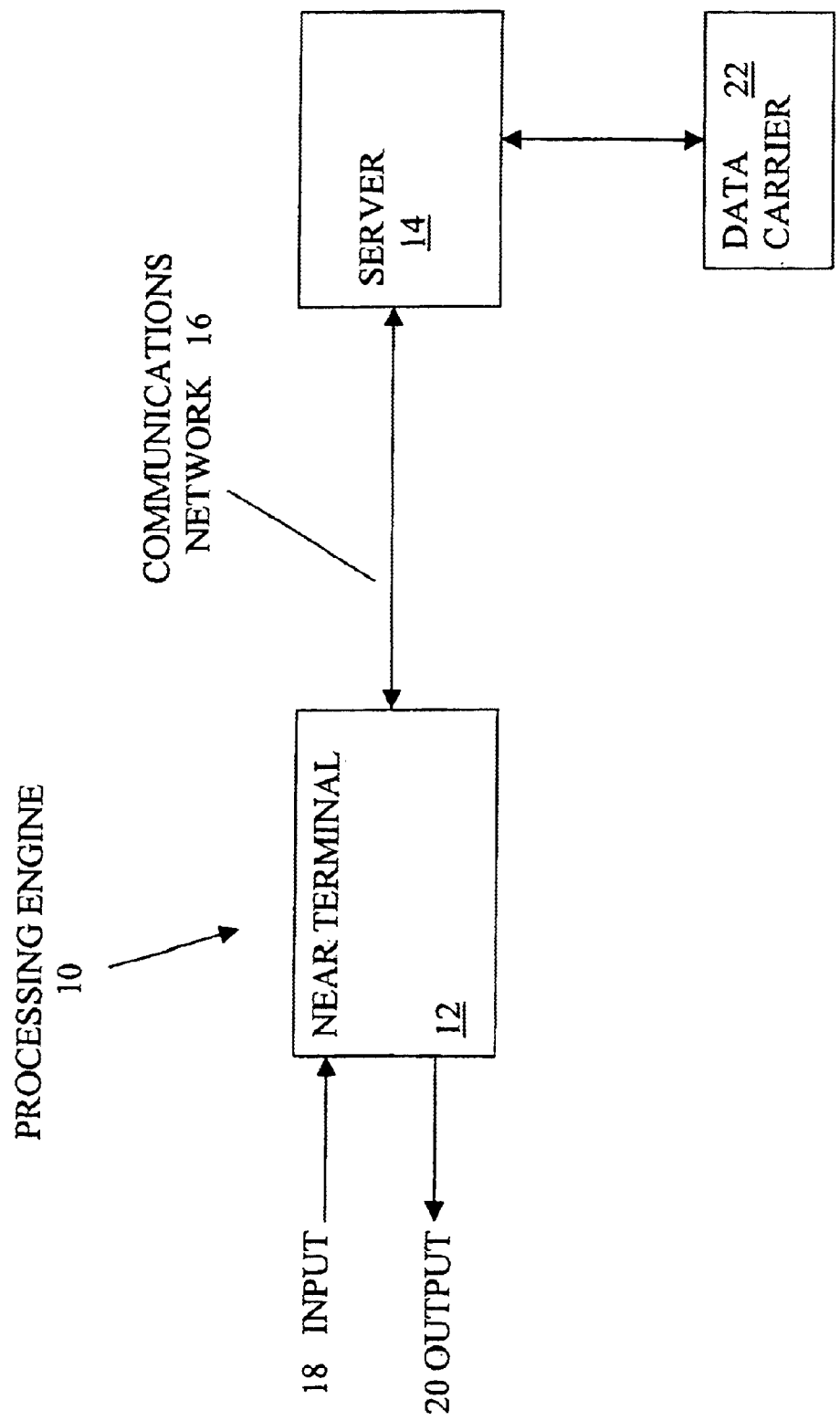
FIG. 10 is a block diagram of an apparatus useful for performing methods of the invention.

By way of example only and with reference to FIG. 10, in one embodiment a near terminal 12 which communicates with a server 14 via a communications network 16 such as the Internet, or an Intranet. Information about a body to be analyzed or assessed is entered into an input 18 at the near terminal 12, e.g. in the form of a representation of the body and coordinates of a reference point. This is communicated to the server 14 which performs one or more methods of the invention and provides to an output 20 of the near terminal 12 a response in accordance with the methods described above. The server 14 operates in conjunction with a computer program which implements the invention and which is stored on a data carrier 22 which is accessible to the server 14.

The methods of the present invention may be implemented as computer programs which may be stored on data carriers such as diskettes or CD-ROMS. These programs may also be downloaded via the Internet or any other telecommunications network.

Figure 11:
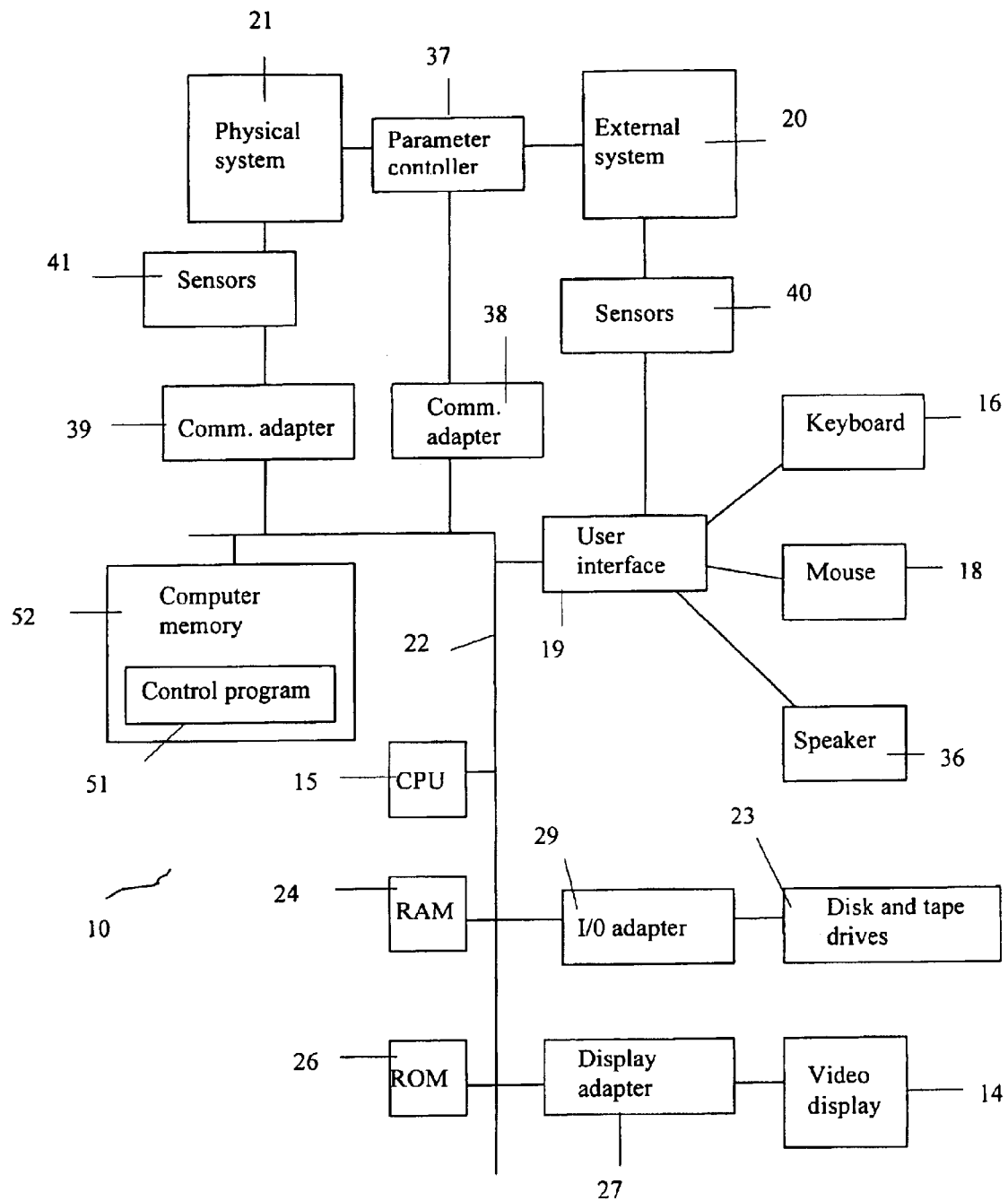
FIG. 11 is a representation of a computer system for use with the present invention.

FIG. 11 is a schematic representation of a computing system which can be utilized with the methods and in a system according to the present invention. A computer 10 is depicted which may include a video display terminal 14, a data input means such as a keyboard 16, and a graphic user interface indicating means such as a mouse 18. Computer 10 may be implemented as a general purpose computer, e.g. a UNIX workstation.

Computer 10 includes a Central Processing Unit ("CPU") 15, such as a conventional microprocessor of which a Pentium III processor supplied by Intel Corp. USA is only an example, and a number of other units interconnected via system bus 22. The computer 10 includes at least one memory. Memory may include any of a variety of data storage devices known to the skilled person such as random-access memory ("RAM"), read-only memory ("ROM"), non-volatile read/write memory such as a hard disc as known to the skilled person. For example, computer 10 may further include random-access memory ("RAM") 24, read-only memory ("ROM") 26, as well as an optional display adapter 27 for connecting system bus 22 to an optional video display terminal 14, and an optional input/output (I/O) adapter 29 for connecting peripheral devices (e.g., disk and tape drives 23) to system bus 22. Video display terminal 14 can be the visual output of computer 10, which can be any suitable display device such as a CRT-based video display well-known in the art of computer hardware. However, with a portable or notebook-based computer, video display terminal 14 can be replaced with a LCD-based or a gas plasma-based flat-panel display. Computer 10 further includes user interface adapter 19 for connecting a keyboard 16, mouse 18, optional speaker 36, as well as allowing optional physical value inputs from physical value capture devices such as sensors 40 of an external system 20. The sensors 40 may be any suitable sensors for capturing physical parameters of system 20. These sensors may include any sensor for capturing relevant physical values required for solution of the problems addressed by the present invention Such sensors can be microphones and accelerometers (for acoustics). Additional or alternative sensors 41 for capturing physical parameters of an additional or alternative physical system 21 may also connected to bus 22 via a communication adapter 39 connecting computer 10 to a data network such as the Internet, an Intranet a Local or Wide Area network (LAN or WAN) or a CAN. This allows transmission of physical values or a representation of the physical system to be simulated over a telecommunications network, e.g. entering a description of a physical system at a near location and transmitting it to a remote location, e.g. via the Internet, where a processor carries out a method in accordance with the present invention and returns a parameter relating to the physical system to a near location.

The terms "physical value capture device" or "sensor" includes devices which provide values of parameters of a physical system to be simulated. Similarly, physical value capture devices or sensors may include devices for transmitting details of evolving physical systems. The present invention also includes within its scope that the relevant physical values are input directly into the computer using the keyboard 16 or from storage devices such as 23.

A parameter control unit 37 of system 20 and/or 21 may also be connected via a communications adapter 38. Parameter control unit 37 may receive an output value from computer 10 running a computer program for numerical analysis in accordance with the present invention or a value representing or derived from such an output value and may be adapted to alter a parameter of physical system 20 and/or system 21 in response to receipt of the output value from computer 10. For example, a dimension of the body or structure to be simulated may be altered, a material may be changed, a stiffening or dampening element may be added or removed.

Computer 10 also includes a graphical user interface that resides within machine-readable media to direct the operation of computer 10. Any suitable machine-readable media may retain the graphical user interface, such as a random access memory (RAM) 24, a read-only memory (ROM) 26, a magnetic diskette, magnetic tape, or optical disk (the last three being located in disk and tape drives 23). Any suitable operating system and associated graphical user interface (e.g., Microsoft Windows) may direct CPU 15. In addition, computer 10 includes a control program 51 which resides within computer memory storage 52. Control program 51 contains instructions that when executed on CPU 15 carry out the operations described with respect to any of the methods of the present invention.

Those skilled in the art will appreciate that the hardware represented in FIG. 11 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described.

In the example depicted in FIG. 11, the computer program product (i.e. control program 51) can reside in computer storage 52. However, it is important that while the present invention has been, and will continue to be, that those skilled in the art will appreciate that the mechanisms of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links.

While the invention has been shown and described with reference to preferred embodiments, it will be understood by those skilled in the art that various changes or modifications in form and detail may be made without departing from the scope and spirit of this invention.

What is claimed is:

1. A method for computing a Wave Transfer Vector from a surface point on a body to a reference position remote from the body based on the reciprocity principle, comprising the steps of:

simulating positioning of a monopole, omnidirectional wave energy source at the reference position remote from the body;

computing a boundary oscillation amplitude of the wave generated by the source at a surface of the body; and deriving from the boundary oscillation amplitude said Wave Transfer Vector.

2. The method of claim 1 wherein the computing step is carried out by a numerical method.

3. The method according to claim 2 wherein the numerical method is one of: a finite element method, a combination of the finite and infinite element methods, a direct boundary element method, a direct multi-domain boundary element method, a indirect boundary element method.

4. A processing engine adapted to carry out the method of claim 2.

5. A computer program product for executing on a computer, the computer program product executing the method steps of claim 2 when executed on the computer.

6. A method of inputting at a near terminal a representation of a body and coordinates of a reference point and transmitting these to a remote terminal running a program for executing the method of claim 2, and receiving at a near location an output of any of the methods.

7. The method according to claim 1, wherein wave source is an acoustic source.

8. The method of claim 1 further comprising a step of computing an additional Wave Transfer Vector comprising:

computing at least a first and a second wave transfer vector at a first and a second predetermined frequency, respectively, and computing the additional Wave Transfer Vector at a frequency intermediate the first and second frequency by interpolation between the first and second Wave Transfer Vectors.

9. The method of claim 8 wherein the interpolation technique is one of a polynomial interpolation mechanism and a spline interpolation mechanism.

10. The method according to claim 1 wherein the Wave Transfer Vector is an Acoustic Transfer Vector, further comprising the step of computing a Modal Acoustic Transfer Vector (MATV) from an acoustic transfer vector (ATV) in an alternative coordinate system defined by a set of deformed shapes of a body, comprising:

projecting the ATV into the alternative coordinate system.

11. The method of claim 10 further comprising the step of:

using the MATV to predict a response of the body or the effect of such a response at a reference point remote from the body.

12. A processing engine adapted to carry out the method of claim 1.

13. A computer program product for executing on a computer, the computer program product executing the method steps of claim 1 when executed on the computer.

14. A method of inputting at a near terminal a representation of a body and coordinates of a reference point and transmitting these to a remote terminal running a program for executing the method of claim 1, and receiving at a near location an output of any of the methods.

15. The method according to claim 14, wherein the output is one of:

an ATV, an oscillation amplitude such as an acoustic pressure level, a surface vibration of the body, a revised design of at least a part of the body.

16. A computer system for computing a Wave Transfer Vector from a surface point on a body to a reference position remote from the body based on the reciprocity principle, comprising:

means for simulating positioning of a monopole, omnidirectional wave energy source at the reference position remote from the body;

means for computing a boundary oscillation amplitude of the wave generated by the source at a surface of the body; and means for deriving from the boundary oscillation amplitude said Wave Transfer Vector.

17. The computer system according to claim 16, further comprising means for computing an additional Wave Transfer Vector at a frequency intermediate a first and second frequency by interpolation between a first and a second Wave Transfer Vector at the first and second frequencies.

18. The computer system according to claim 17, wherein the Wave Transfer Vector is an Acoustic Transfer Vector, further comprising: means for computing a Modal Acoustic Transfer Vector (MATV) from an acoustic transfer vector (ATV) in an alternative coordinate system defined by a set of deformed shapes a body by projecting the ATV into the modal space.

19. The computer system according to claim 16, wherein the Wave Transfer Vector is an Acoustic Transfer Vector, further comprising: means for computing a Modal Acoustic Transfer Vector (MATV) from an acoustic transfer vector (ATV) in an alternative coordinate system defined by a set of deformed shapes a body by projecting the ATV into the modal space.

* * * * *